(12) United States Patent
Takahashi (10) Patent No.: US 10,495,082 B2
(45) Date of Patent: Dec. 3, 2019

(54) CRYOPUMP, CRYOPUMPED GAS AMOUNT ESTIMATION DEVICE, AND CRYOPUMPED GAS AMOUNT ESTIMATION METHOD

(71) Applicant: SUMITOMO HEAVY INDUSTRIES, LTD., Tokyo (JP)

(72) Inventor: Kakeru Takahashi, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 347 days.

(21) Appl. No.: 15/465,231

(22) Filed: Mar. 21, 2017

(65) Prior Publication Data
US 2017/0276129 A1  Sep. 28, 2017

(30) Foreign Application Priority Data
Mar. 22, 2016 (JP) ................................. 2016-057049

(51) Int. Cl.
| | |
|---|---|
| F04B 37/08 | (2006.01) |
| F04B 51/00 | (2006.01) |
| F04B 39/10 | (2006.01) |
| G01L 21/32 | (2006.01) |
| F04B 49/06 | (2006.01) |

(52) U.S. Cl.
CPC .............. *F04B 51/00* (2013.01); *F04B 37/08* (2013.01); *F04B 37/085* (2013.01); *F04B 39/10* (2013.01); *F04B 49/06* (2013.01); *G01L 21/32* (2013.01)

(58) Field of Classification Search
CPC ... F04B 37/08; G01L 7/00; G01L 9/00; G01F 1/00; G01F 3/00; G01F 5/00
USPC .......................................................... 62/55.5
See application file for complete search history.

(56) References Cited

U.S. PATENT DOCUMENTS

| | | | |
|---|---|---|---|
| 5,582,017 A | 12/1996 | Noji et al. | |
| 2010/0294195 A1* | 11/2010 | Katou | C30B 7/10 117/73 |
| 2014/0322055 A1* | 10/2014 | Calhoun | F04C 18/0215 418/1 |

FOREIGN PATENT DOCUMENTS

| | | |
|---|---|---|
| JP | H07-293438 A | 11/1995 |
| JP | H08-061233 A | 3/1996 |
| JP | H09-014133 A | 1/1997 |
| JP | H11-072081 A | 3/1999 |

* cited by examiner

*Primary Examiner* — Jonathan Bradford
(74) *Attorney, Agent, or Firm* — Michael Best & Friedrich LLP (57) ABSTRACT

A cryopumped gas amount estimation device includes: an ultimate pressure determination unit which determines an ultimate pressure of a cryopump vacuum vessel, based on a vacuum measurement signal representing the degree of vacuum in the cryopump vacuum vessel; and a cryopumped gas amount quantification unit which includes a cryopumped gas amount quantification relation correlating the ultimate pressure with a cryopumped gas amount estimated value and converts the ultimate pressure into the cryopumped gas amount estimated value.

7 Claims, 6 Drawing Sheets

CRYOPUMP, CRYOPUMPED GAS AMOUNT ESTIMATION DEVICE, AND CRYOPUMPED GAS AMOUNT ESTIMATION METHOD

RELATED APPLICATIONS

Priority is claimed to Japanese Patent Application No. 2016-057049, filed Mar. 22, 2016, the entire content of which is incorporated herein by reference.

BACKGROUND

Technical Field

Certain embodiments of the present invention relate to a cryopump, a cryopumped gas amount estimation device, and a cryopumped gas amount estimation method.

Description of Related Art

A cryopump is a vacuum pump that captures and exhausts gas molecules by condensation or adsorption using a cryopanel cooled to an extremely low temperature. The cryopump is generally used in order to realize a clean vacuum environment which is required for a semiconductor circuit manufacturing process or the like.

SUMMARY

According to an aspect of the present invention, there is provided a cryopump including: a cryopump vacuum vessel; a vacuum gauge which is installed at the cryopump vacuum vessel so as to measure vacuum in the cryopump vacuum vessel and outputs a vacuum measurement signal; and a cryopumped gas amount estimation unit which is connected to the vacuum gauge so as to receive the vacuum measurement signal and includes an ultimate pressure determination unit which determines an ultimate pressure of the cryopump vacuum vessel, based on the vacuum measurement signal, and a cryopumped gas amount quantification unit which includes a cryopumped gas amount quantification relation correlating the ultimate pressure with a cryopumped gas amount estimated value and converts the ultimate pressure into the cryopumped gas amount estimated value.

According to another aspect of the present invention, there is provided a cryopumped gas amount estimation device including: an ultimate pressure determination unit which determines an ultimate pressure of a cryopump vacuum vessel, based on a vacuum measurement signal representing the degree of vacuum in the cryopump vacuum vessel; and a cryopumped gas amount quantification unit which includes an cryopumped gas amount quantification relation correlating the ultimate pressure with a cryopumped gas amount estimated value and converts the ultimate pressure into the cryopumped gas amount estimated value.

According to still another aspect of the present invention, there is provided a cryopumped gas amount estimation method including: generating a vacuum measurement signal by measuring vacuum in a cryopump vacuum vessel; determining an ultimate pressure of the cryopump vacuum vessel, based on the vacuum measurement signal; and converting the ultimate pressure into a cryopumped gas amount estimated value by using a cryopumped gas amount quantification relation correlating the ultimate pressure with the cryopumped gas amount estimated value.

DETAILED DESCRIPTION

The cryopump is an entrapment vacuum pump, and therefore, gas is accumulated in the cryopump due to a vacuum pumping operation of the cryopump. The exhaust velocity of the cryopump gradually decreases as the gas accumulates. For this reason, regeneration of the cryopump is periodically performed in order to discharge the accumulated gas from the cryopump, thereby making the exhaust velocity recover to the initial level. The period of the vacuum pumping operation after the previous regeneration is ended and until the next regeneration is performed is also called a regeneration interval. It is not possible to perform the vacuum pumping operation of the cryopump during the regeneration, and therefore, it is desirable that the regeneration interval is as long as possible.

In a certain use of the cryopump, gas which is introduced for a process accounts for most of gas which is captured by the cryopump. It is usually the case that process gas which is introduced is controlled and weighed. The amount of cryopumped gas of the cryopump can be accurately obtained by calculation from the gas introduction amount, and therefore, the regeneration interval can be easily set based on it.

In contrast, in other uses, the cryopump is used in order to remove by-product gas in a process (for example, a relatively large amount of hydrogen gas which is generated in an ion implantation process). The amount of generation of the by-product gas is generally uncertain. Therefore, the amount of gas pumped in the cryopump is also uncertain, and thus it is difficult to appropriately set the regeneration interval. A short regeneration interval is not desired as described above. If the regeneration interval is too long, a decrease in the exhaust velocity of the cryopump becomes remarkable, and thus vacuum failure can occur frequently.

It is desirable to provide an index helpful to proper setting of a cryopump regeneration interval.

Arbitrary combinations of the above constituent elements, or mutual substitutions of constituent elements or expressions of the present invention between apparatuses, methods, systems, computer programs, recording mediums with computer programs stored therein, or the like are also effective as aspects of the present invention.

According to an embodiment of the present invention, it is possible to provide an index helpful to proper setting of a cryopump regeneration interval.

Hereinafter, a mode for carrying out the present invention will be described in detail with reference to the drawings. In the description, the same elements are denoted by the same reference numerals and overlapping description is omitted as appropriate. Further, the configurations which are described below are exemplification and do not limit the scope of the present invention.

Figure 1:
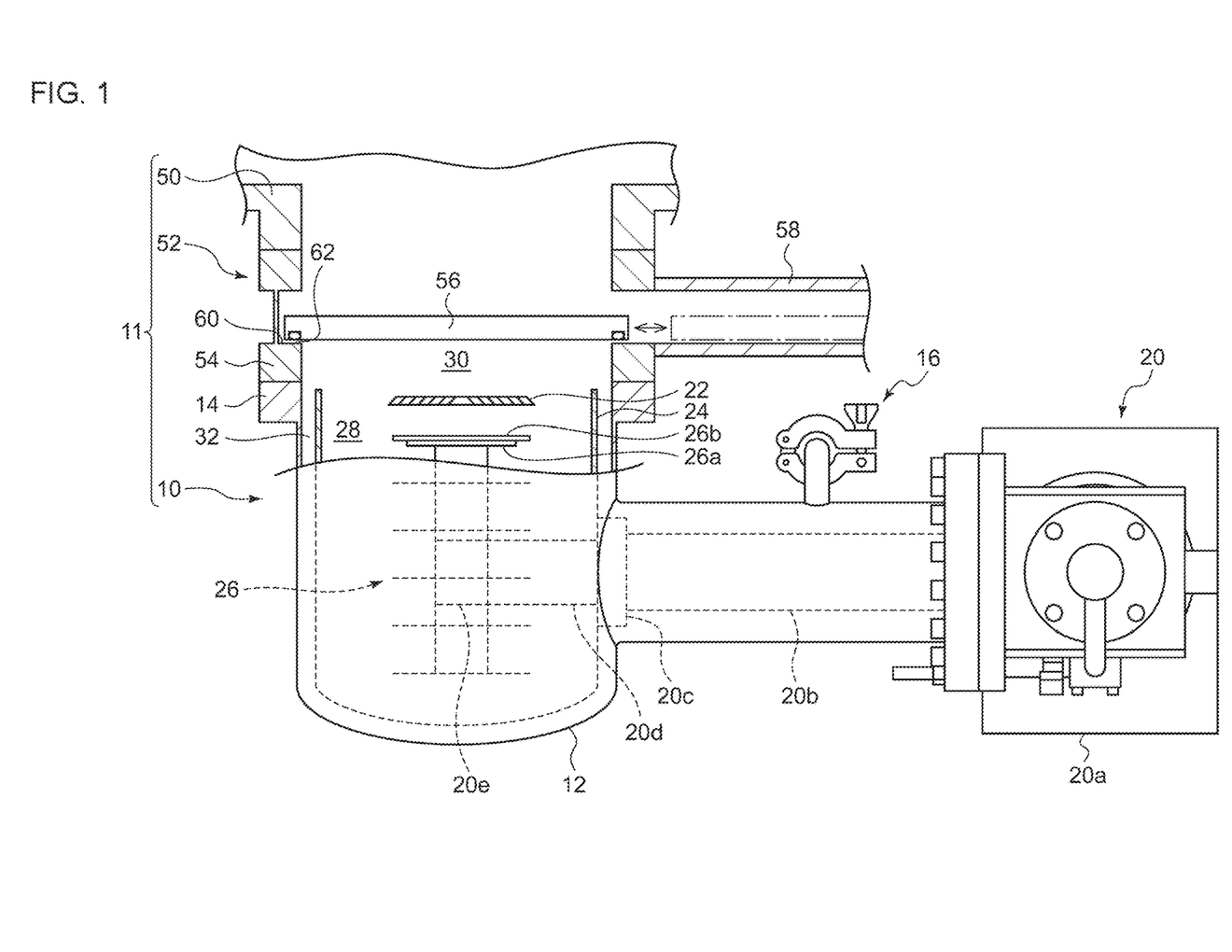
FIG. 1 is a diagram schematically showing a cryopump according to an embodiment and peripheral equipment.

FIG. 1 is a diagram schematically showing a cryopump 10 according to an embodiment and peripheral equipment. The cryopump 10 is mounted in a vacuum chamber of, for example, an ion implantation apparatus, a sputtering apparatus, or the like and used in order to increase the degree of vacuum of the inside of the vacuum chamber to a level which is required for a desired process.

A gate valve 52 is installed between the cryopump 10 and a vacuum chamber 50. A vacuum process apparatus 11 which includes the cryopump 10, the vacuum chamber 50, and the gate valve 52 is configured.

The gate valve 52 is provided with a gate valve flange 54, a valve plate 56, and a valve plate storage part 58. The valve plate 56 is a valve body of the gate valve 52, and the gate valve flange 54 has a valve seat 60. When the valve plate 56 is in close contact with the valve seat 60, the gate valve 52 is completely closed. The valve plate 56 closes an intake port 30 of the cryopump 10, and therefore, a gas flow from the vacuum chamber 50 to the cryopump 10 is blocked. When the valve plate 56 is separated from the valve seat 60 and stored in the valve plate storage part 58, as shown by a dot-and-dash line in FIG. 1, the gate valve 52 is completely opened.

The valve plate 56 shown in FIG. 1 is at an intermediate position between a fully open position and a fully closed position. As shown in the drawing, the valve plate 56 is slightly away from the valve seat 60, and a gate valve clearance 62 is formed between the valve plate 56 and the valve seat 60. The gate valve clearance 62 is variable by the movement of the valve plate 56.

The cryopump 10 is provided with a cryopump vacuum vessel 12, a cryopump flange 14, and a vacuumgauge 16. In addition, the cryopump 10 is provided with a cryocooler 20, an inlet cryopanel 22, a radiation shield 24, and a second cryopanel unit 26. The inlet cryopanel 22 and the radiation shield 24 can be collectively referred to as a first cryopanel unit.

The cryopump vacuum vessel 12 is a case of the cryopump 10, which accommodates the cryocooler 20, the inlet cryopanel 22, the radiation shield 24, and the second cryopanel unit 26, and is configured so as to maintain the vacuum tightness of an internal space 28 of the cryopump 10. The cryopump vacuum vessel 12 is mounted on a room temperature part 20a of the cryocooler 20. The cryopump vacuum vessel 12 surrounds the radiation shield 24 and the inlet cryopanel 22. The radiation shield 24 surrounds the second cryopanel unit 26 along with the inlet cryopanel 22.

The cryopump flange 14 extends radially outward from a front end of the cryopump vacuum vessel 12. The cryopump flange 14 is provided over the entire circumference of the front end of the cryopump vacuum vessel 12. The intake port 30 of the cryopump 10 is defined radially inside of the cryopump flange 14. The cryopump flange 14 is mounted on the gate valve flange 54, whereby the cryopump 10 is mounted on the vacuum chamber 50. Gas enters from the vacuum chamber 50 into the internal space 28 of the cryopump 10 through the gate valve 52 and the intake port 30.

The vacuum gauge 16 is installed at the cryopump vacuum vessel 12 so as to measure the vacuum in the cryopump vacuum vessel 12. The vacuum gauge 16 is an ionization vacuum gauge capable of measuring a high vacuum of $10^{-5}$ Pa. The measurement range of the vacuum gauge 16 may be, for example, a range from 1 Pa (or 10 Pa) to $10^{-5}$ Pa (or $10^{-6}$ Pa). The vacuum gauge 16 may be a hot cathode ionization vacuum gauge such as a triode type vacuum gauge or a BA vacuum gauge.

Subsequently, other constituent elements of the cryopump 10 will be described.

In the following, in order to clearly show the positional relationship between constituent elements of the cryopump 10, the terms "axial direction" and "radial direction" are sometimes used. The axial direction represents a direction (a longitudinal direction in FIG. 1) passing through the intake port 30, and the radial direction represents a direction (a lateral direction in FIG. 1) along the intake port 30. For convenience, with respect to the axial direction, the side relatively close to the intake port 30 is sometimes referred to as an "upper side" and the side relatively far from the intake port 30 is sometimes referred to as a "lower side". That is, the side relatively far from the bottom of the cryopump 10 is sometimes referred to as an "upper side" and the side relatively close to the bottom of the cryopump 10 is sometimes referred to as a "lower side". With respect to the radial direction, the side close to the center of the intake port 30 is sometimes referred to as an "inner side" and the side close to a peripheral edge of the intake port 30 is sometimes referred to as an "outer side". Such expressions are not related to the disposition when the cryopump 10 has been mounted in the vacuum chamber 50. For example, the cryopump 10 may be mounted in the vacuum chamber 50 with the intake port 30 facing downward in a vertical direction.

Further, a direction around the axial direction is sometimes referred to as a "circumferential direction". The circumferential direction is a second direction along the intake port 30 and is a tangential direction orthogonal to the radial direction.

The cryocooler 20 is a cryocooler such as a Gifford McMahon type cryocooler (a so-called GM cryocooler), for example. The cryocooler 20 is a two-stage type cryocooler. For this reason, the cryocooler 20 is provided with a first cylinder 20b, a first cooling stage 20c, a second cylinder 20d, and a second cooling stage 20e, in addition to the room temperature part 20a.

The cryocooler 20 is configured so as to cool the first cooling stage 20c to a first cooling temperature and cool the second cooling stage 20e to a second cooling temperature. The second cooling temperature is lower than the first cooling temperature. For example, the first cooling stage 20c is cooled to a temperature in a range of about 65 K to 120 K, preferably, a range of 80 K to 100 K, and the second cooling stage 20e is cooled to a temperature in a range of about 10 K to 20 K.

The first cylinder 20b and the second cylinder 20d form a cryocooler structure part which structurally supports the second cooling stage 20e on the first cooling stage 20c and structurally supports the first cooling stage 20c on the room temperature part 20a of the cryocooler 20. The first cylinder 20b and the second cylinder 20d extend coaxially along the radial direction. The first cylinder 20b connects the room temperature part 20a of the cryocooler 20 to the first cooling stage 20c, and the second cylinder 20d connects the first cooling stage 20c to the second cooling stage 20e. The room temperature part 20a, the first cylinder 20b, the first cooling stage 20c, the second cylinder 20d, and the second cooling stage 20e are linearly arranged in a row in this order.

A first displacer and a second displacer (not shown) are respectively disposed in the first cylinder 20b and the second cylinder 20d so as to be able to reciprocate therein. A first regenerator and a second regenerator (not shown) are respectively incorporated in the first displacer and the second displacer. Further, the room temperature part 20a has a drive mechanism (not shown) for reciprocating the first displacer and the second displacer. The drive mechanism includes a flow path switching mechanism for switching a flow path of working gas (for example, helium) so as to periodically repeat the supply and discharge of the working gas to and from the inside of the cryocooler 20.

The cryocooler 20 is connected to a working gas compressor (not shown). The cryocooler 20 expands the working gas pressurized by the compressor inside thereof, thereby cooling the first cooling stage 20c and the second cooling stage 20e. The expanded working gas is recovered to the compressor and pressurized again. The cryocooler 20 generates cold by repeating a thermal cycle which includes the supply and discharge of the working gas and the reciprocation of the first displacer and the second displacer synchronizing with the supply and discharge of the working gas.

The cryopump 10 shown in the drawing is a so-called horizontal type cryopump. The horizontal type cryopump is generally a cryopump in which the cryocooler 20 is disposed such that a central axis of the cryocooler 20 is orthogonal to a central axis of the radiation shield 24 and the second cooling stage 20e is disposed at a central portion of the radiation shield 24.

The radiation shield 24 is provided in order to protect the second cryopanel unit 26 from the radiant heat of the cryopump vacuum vessel 12. The radiation shield 24 is thermally coupled to the first cooling stage 20c. Accordingly, the first cryopanel unit is cooled to the first cooling temperature. The radiation shield 24 has a gap 32 between itself and the cryopump vacuum vessel 12, and thus the radiation shield 24 is not in contact with the cryopump vacuum vessel 12.

The inlet cryopanel 22 is disposed so as to cover at least a portion of a main opening of the radiation shield 24 in order to protect the second cryopanel unit 26 from the radiant heat from a heat source outside the cryopump 10 (for example, a heat source in the vacuum chamber 50). The inlet cryopanel 22 restricts not only the radiant heat but also the ingress of gas into the internal space 28. The inlet cryopanel 22 is thermally coupled to the first cooling stage 20c through the radiation shield 24. Gas (for example, water) which is condensed at the first cooling temperature is captured on the surface of the inlet cryopanel 22.

The second cryopanel unit 26 is provided with a plurality of cryopanels, and these cryopanels are mounted on the second cooling stage 20e so as to surround the second cooling stage 20e. The second cryopanel unit 26 is not in contact with the first cryopanel unit. The second cryopanel unit 26 is thermally coupled to the second cooling stage 20e and is cooled to the second cooling temperature.

In the second cryopanel unit 26, an adsorption region 26a is formed on at least a part of the surface thereof. The adsorption region 26a is provided in order to capture non-condensable gas (for example, hydrogen) by adsorption. The adsorption region 26a is formed at a place which is the shade of the adjacent cryopanel on the upper side, so as not to be seen from the intake port 30. That is, the adsorption regions 26a are formed on a central portion of the upper surface and the entire lower surface of each cryopanel. However, the adsorption region 26a is not provided on the upper surface of the top cryopanel directly facing the inlet cryopanel 22. The adsorption region 26a is formed, for example, by bonding an adsorbent (for example, activated carbon) to the surface of the cryopanel.

Further, a condensation region 26b for capturing condensable gas by condensation is formed on the surface of at least a part of the second cryopanel unit 26. The condensation region 26b is, for example, an area where the adsorbent is absent on the surface of the cryopanel, and the surface of a cryopanel base material, for example, a metal surface is exposed.

An operation of the cryopump 10 having the configuration described above will be described hereinafter. At the time of the operation of the cryopump 10, first, the inside of the vacuum chamber is subjected to rough pumping to about 1 Pa with another suitable roughing pump prior to the operation. Thereafter, the cryopump 10 is operated. The first cooling stage 20c and the second cooling stage 20e are respectively cooled to the first cooling temperature and the second cooling temperature by the driving of the cryocooler 20. Accordingly, the first cryopanel unit and the second cryopanel unit 26 thermally coupled to them are also respectively cooled to the first cooling temperature and the second cooling temperature.

The inlet cryopanel 22 cools gas flying towards the cryopump 10 from the vacuum chamber. Gas having a vapor pressure (of, for example, $10^{-8}$ Pa or less) which is sufficiently low at the first cooling temperature is condensed on the surface of the inlet cryopanel 22. This gas may be referred to as a type 1 gas. The type 1 gas is, for example, water vapor. In this way, the inlet cryopanel 22 can exhaust the type 1 gas. Some of gas having a vapor pressure which is not sufficiently low at the first cooling temperature enter from the intake port 30 into the internal space 28. Alternatively, some other gas is reflected by the inlet cryopanel 22 and does not enter the internal space 28.

The gas having entered the internal space 28 is cooled by the second cryopanel unit 26. Gas having a vapor pressure (of, for example, $10^{-8}$ Pa or less) which is sufficiently low at the second cooling temperature is condensed on the surface of the second cryopanel unit 26. This gas may be referred to as a type 2 gas. The type 2 gas is, for example, argon. In this way, the second cryopanel unit 26 can exhaust the type 2 gas.

Gas having a vapor pressure which is not sufficiently low at the second cooling temperature is adsorbed to the adsorbent of the second cryopanel unit 26. This gas may be referred to as a type 3 gas. The type 3 gas is, for example, hydrogen. In this way, the second cryopanel unit 26 can exhaust the type 3 gas. Therefore, the cryopump 10 can exhaust various gases by condensation or adsorption, thereby allowing the degree of vacuum of the vacuum chamber to reach a desired level.

Figure 2:
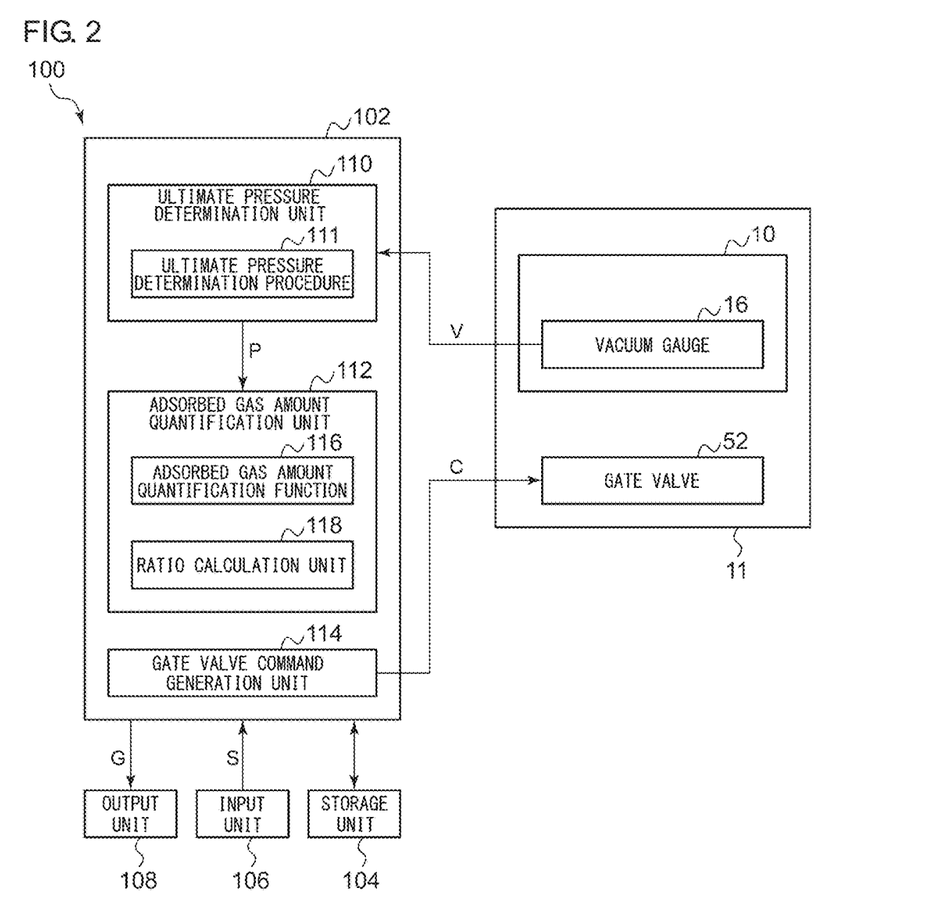
FIG. 2 is a diagram schematically showing the configuration of a cryopumped gas amount estimation device according to an embodiment.

FIG. 2 is a diagram schematically showing the configuration of a cryopump adsorbed gas amount estimation device (hereinafter also referred to as an estimation device) 100 according to an embodiment. Such an estimation device is realized by hardware, software, or a combination thereof. Further, in FIG. 2, the configuration of apart of the related vacuum process apparatus 11 is schematically shown.

The estimation device 100 may be a part of the cryopump 10. For example, the estimation device 100 may be provided integrally with a control device for controlling the cryopump 10. The estimation device 100 may be a separate device from the cryopump 10. For example, the estimation device 100 may be configured as a separate calculation device from the cryopump control device. The estimation device 100 may be a part of the vacuum process apparatus 11.

The estimation device 100 is provided with an adsorbed gas amount estimation unit 102, a storage unit 104, an input unit 106, and an output unit 108. The adsorbed gas amount estimation unit 102 is provided with an ultimate pressure determination unit 110, an adsorbed gas amount quantification unit 112, and a gate valve command generation unit 114. The ultimate pressure determination unit 110 is provided with an ultimate pressure determination procedure 111. The adsorbed gas amount quantification unit 112 is provided with an adsorbed gas amount quantification function (relation) 116.

The vacuum gauge 16 is configured so as to periodically measure the degree of vacuum in the cryopump vacuum vessel 12 and output a vacuum measurement signal V representing the degree of vacuum. The adsorbed gas amount estimation unit 102 is connected to the vacuum gauge 16 so as to receive the vacuum measurement signal V.

The storage unit 104 is configured so as to store data related to an adsorbed gas amount estimation processing. For example, the storage unit 104 stores the adsorbed gas amount quantification function 116 and/or a waiting time and a threshold value for ultimate pressure determination in advance.

The input unit 106 is configured so as to receive input from a user or another device. For example, the input unit 106 is configured so as to receive an adsorbed gas amount estimation start command S. The input unit 106 includes, for example, input means such as a mouse or a keyboard for receiving input from a user, and/or communication means for communicating with another device.

The output unit 108 is configured so as to output data related to the adsorbed gas amount estimation processing, and includes output means such as a display or a printer. For example, the output unit 108 is configured so as to output an adsorbed gas amount estimated value G. The output unit 108 may be configured so as to output a value calculated based on the adsorbed gas amount estimated value G.

Each of the storage unit 104, the input unit 106, and the output unit 108 is communicably connected to the adsorbed gas amount estimation unit 102. Accordingly, the adsorbed gas amount estimation unit 102 can read data from the storage unit 104 and/or store data in the storage unit 104, as necessary. Further, the adsorbed gas amount estimation unit 102 can receive data input from the input unit 106 and/or output data to the output unit 108.

The ultimate pressure determination unit 110 is configured so as to determine an ultimate pressure P of the cryopump vacuum vessel 12 according to a predetermined ultimate pressure determination procedure 111. The ultimate pressure determination procedure 111 includes waiting for a predetermined period of time after the closing of the gate valve 52, generating the vacuum measurement signal V by measuring the vacuum in the cryopump vacuum vessel 12 after waiting for a predetermined period of time, and determining the ultimate pressure P of the cryopump vacuum vessel 12, based on the vacuum measurement signal V. The waiting time is set to be the same as the waiting time used when acquiring the adsorbed gas amount quantification function 116, for example. The ultimate pressure determination unit 110 is configured so as to output the determined ultimate pressure P to the adsorbed gas amount quantification unit 112.

As described above, the determination of the ultimate pressure P is based on the vacuum measurement signal V. For example, the ultimate pressure determination unit 110 calculates the pressure in the cryopump vacuum vessel 12 and a decrease rate thereof from the vacuum measurement signal V during the closing of the gate valve 52. The ultimate pressure determination unit 110 determines whether or not the calculated decrease rate falls below a threshold value, and determines the pressure in the cryopump vacuum vessel 12 as being the ultimate pressure P, in a case where the decrease rate falls below the threshold value.

In other words, the ultimate pressure determination unit 110 executes a pressure decrease rate test during the exhaust operation of the cryopump 10 and during the closing of the gate valve 52. Here, the pressure decrease rate test is processing in which if a pressure rise gradient from the pressure at the point in time of start of the determination does not exceed a threshold value, it is determined that it is passing, and if the pressure rise gradient exceeds the threshold value, it is determined that it is a failure. The ultimate pressure determination unit 110 applies the pressure decrease rate test to the pressure in the cryopump vacuum vessel 12, and determines, in the case of passing, the pressure at the point in time as being the ultimate pressure P.

The adsorbed gas amount quantification unit 112 is configured so as to convert the ultimate pressure P into the adsorbed gas amount estimated value G with reference to the adsorbed gas amount quantification function 116. The adsorbed gas amount quantification unit 112 is configured so as to output the adsorbed gas amount estimated value G to the output unit 108.

The adsorbed gas amount quantification unit 112 may be provided with a ratio calculation unit 118 that calculates the ratio of the adsorbed gas amount estimated value G to the gas capacity of the cryopump 10. The gas capacity may represent the maximum adsorbed gas amount (for example, the maximum adsorbed gas amount of hydrogen gas) in the specifications of the cryopump 10. In this case, the output unit 108 may output the ratio of the adsorbed gas amount estimated value G to the gas capacity of the cryopump 10. The indication of the ratio has an advantage that it is easy to intuitively understand how much gas is accumulated in the cryopump 10.

The gate valve command generation unit 114 is configured so as to receive the adsorbed gas amount estimation start command S and output a closing command to the gate valve 52. The gate valve 52 is connected to the adsorbed gas amount estimation unit 102 so as to receive a closing command C generated by the gate valve command generation unit 114 from the adsorbed gas amount estimation unit 102. The gate valve 52 is configured so as to close the intake port 30 in accordance with the closing command C.

Further, the gate valve command generation unit 114 may be configured so as to generate an opening command for the gate valve 52 at the time of the completion of the adsorbed gas amount estimation processing. The gate valve 52 maybe configured so as to open the intake port 30 in accordance with the opening command.

Figure 3:
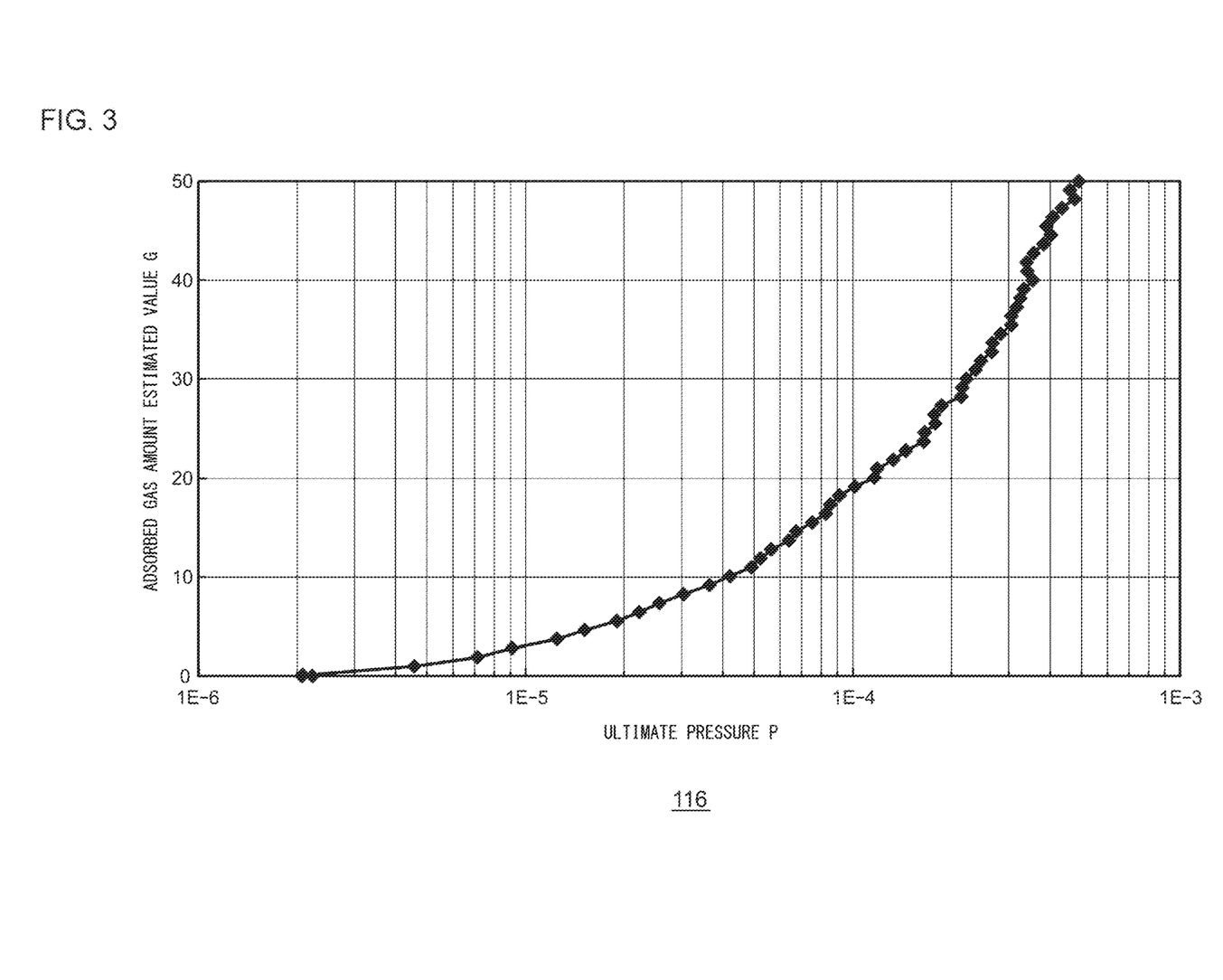
FIG. 3 shows a cryopumped gas amount quantification relation according to an embodiment.

FIG. 3 shows an adsorbed gas amount quantification function 116 according to an embodiment. The adsorbed gas amount quantification function 116 is configured so as to correlate the ultimate pressure P with the adsorbed gas amount estimated value G. The adsorbed gas amount quantification function 116 is, for example, a look-up table or an approximate function for calculating the adsorbed gas amount estimated value G from the ultimate pressure P.

As illustrated in FIG. 3, the adsorbed gas amount quantification function 116 draws a graph that gently monotonically increases when the adsorbed gas amount estimated value G is taken on the vertical axis and the ultimate pressure P is taken in a logarithm on the horizontal axis. The adsorbed gas amount estimated value G becomes large as the ultimate pressure P increases (that is, becomes worse).

Figure 4:
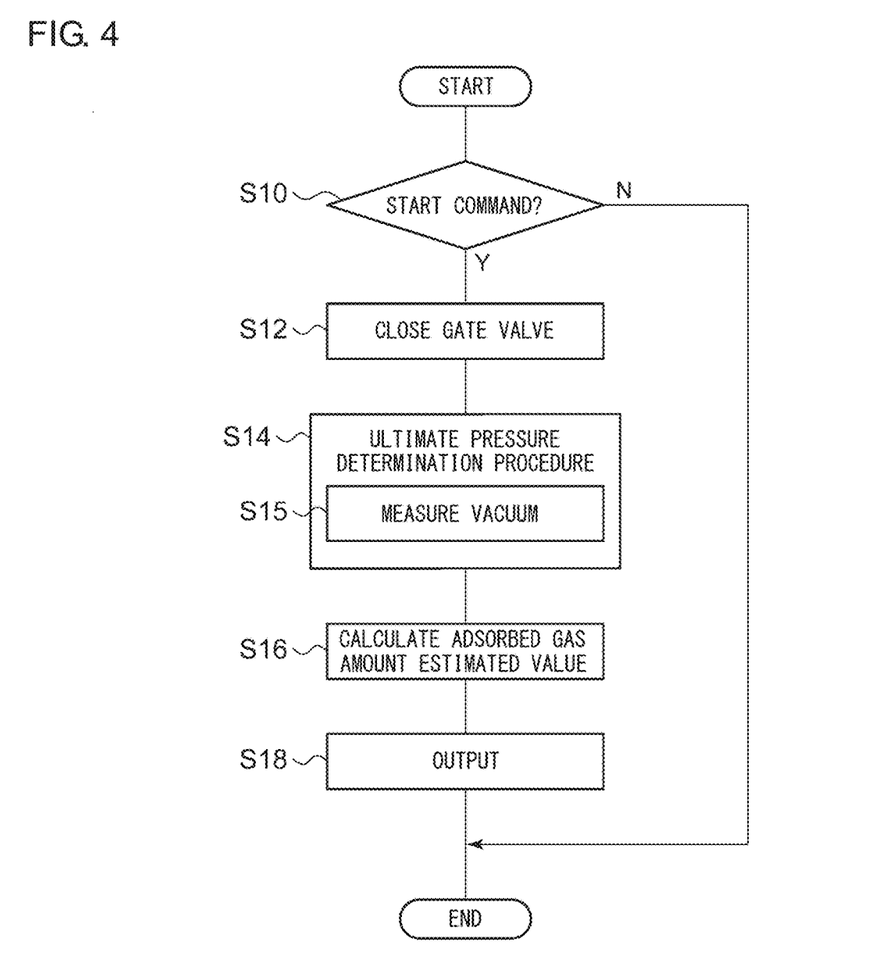
FIG. 4 is a flowchart showing a cryopumped gas amount estimation method according to an embodiment.

FIG. 4 is a flowchart showing a cryopump adsorbed gas amount estimation method according to an embodiment. The estimation device 100 can execute this processing during the operation of the cryopump 10.

First, the adsorbed gas amount estimation unit 102 determines whether or not the adsorbed gas amount estimation start command S has been input (S10). In a case where the adsorbed gas amount estimation start command S has not been input (N of S10), this method is not executed. In a case where the adsorbed gas amount estimation start command S has been input (Y of S10), the gate valve 52 is closed (S12). As described above, the gate valve command generation unit 114 generates the closing command C, and the gate valve 52 is closed accordingly.

The ultimate pressure determination unit 110 executes the ultimate pressure determination procedure 111 (S14). The ultimate pressure determination unit 110 waits for a certain period of time from the closing of the gate valve 52, periodically measures the vacuum in the cryopump vacuum vessel 12 after the waiting for a certain period of time, and generates the vacuum measurement signal V according to the measurement result (S15). The ultimate pressure determination unit 110 performs the pressure decrease rate test, based on the vacuum measurement signal V. The ultimate pressure determination unit 110 periodically repeats the pressure decrease rate test until it passes, and determines, when has passed, the pressure as being the ultimate pressure P.

The ultimate pressure determination unit 110 may suspend the ultimate pressure determination procedure 111 in a case of still being a failure even though the pressure decrease rate test is repeated by a predetermined number of times. In this case, the adsorbed gas amount estimation unit 102 may stop the adsorbed gas amount estimation processing and output the state to the output unit 108.

The adsorbed gas amount quantification unit 112 calculates the adsorbed gas amount estimated value G of the cryopump 10 (S16). The adsorbed gas amount quantification unit 112 converts the ultimate pressure P into the adsorbed gas amount estimated value G by using the adsorbed gas amount quantification function 116.

The output unit 108 outputs the adsorbed gas amount estimated value G (S18). The adsorbed gas amount estimated value G is displayed on a display or the like. The gate valve command generation unit 114 generates the opening command, and the gate valve 52 is opened accordingly. In this way, the adsorbed gas amount estimation processing is ended.

In this way, according to this embodiment, it is possible to quantify and output the adsorbed gas amount of the cryopump 10 as an index helpful to proper setting of the cryopump regeneration interval.

Figure 5:
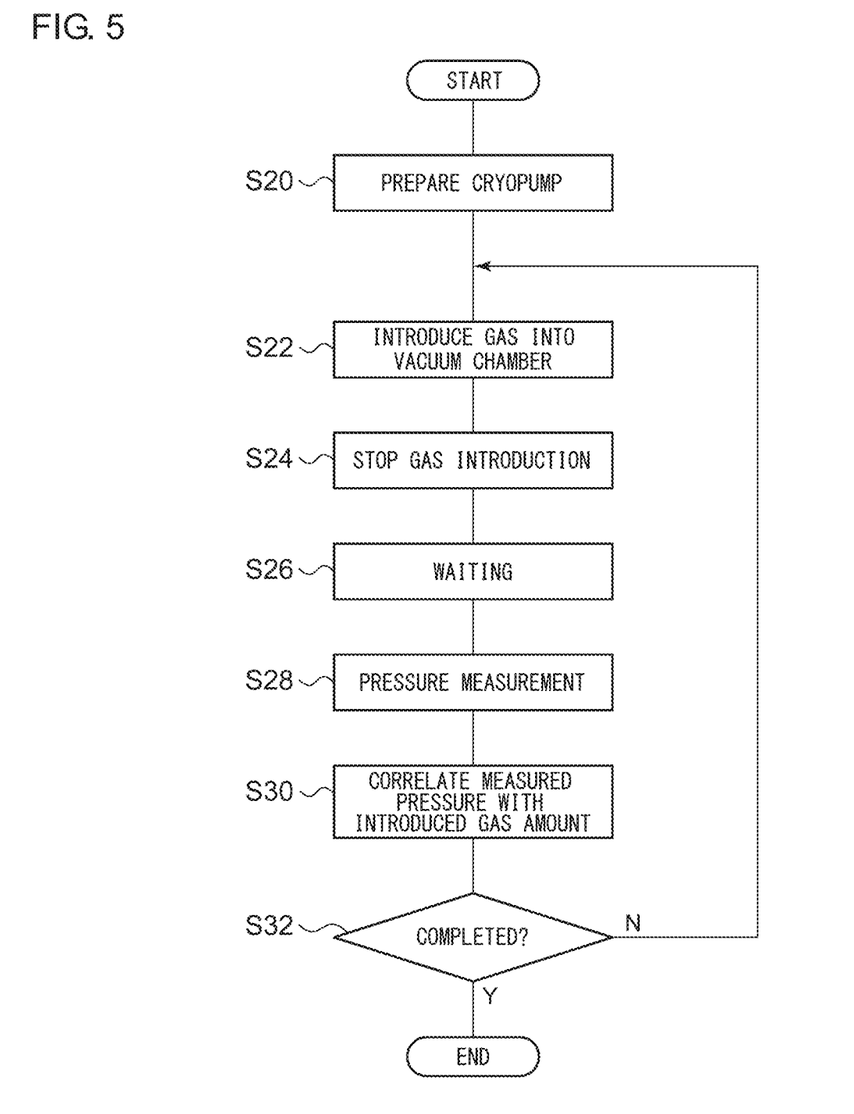
FIG. 5 is a flowchart showing an exemplary method of acquiring the cryopumped gas amount quantification relation, according to an embodiment.

FIG. 5 is a flowchart showing an exemplary method of acquiring the adsorbed gas amount quantification function 116, according to an embodiment. This method is performed prior to the cryopump adsorbed gas amount estimation method described above. By this method, the adsorbed gas amount quantification function 116 is prepared.

First, the cryopump 10 is prepared in a vacuum chamber for a test (S20). Further, the vacuum gauge 16 is installed at the cryopump 10. The vacuum gauge 16 may be installed at the vacuum chamber.

A defined amount of gas (for example, about 10 sccm of hydrogen gas) is introduced into the vacuum chamber (S22). The amount of gas which is introduced is measured, and when it reaches the defined amount, the gas introduction is stopped (S24).

After the stop of the gas introduction, waiting is performed for a predetermined period of time (for example, about 15 minutes) (S26), and after the waiting, the pressure in the cryopump 10 is measured by the vacuum gauge 16 (S28). The waiting time is set to a time sufficient for the introduced gas amount to be captured by the cryopump 10. The measured pressure is correlated with a cumulative introduced gas amount (S30).

Such gas introduction and pressure measurement are repeated to a predetermined total introduced gas amount (N of S32). If the predetermined total introduced gas amount is reached (Y of S32), the measurement is ended.

Figure 6:
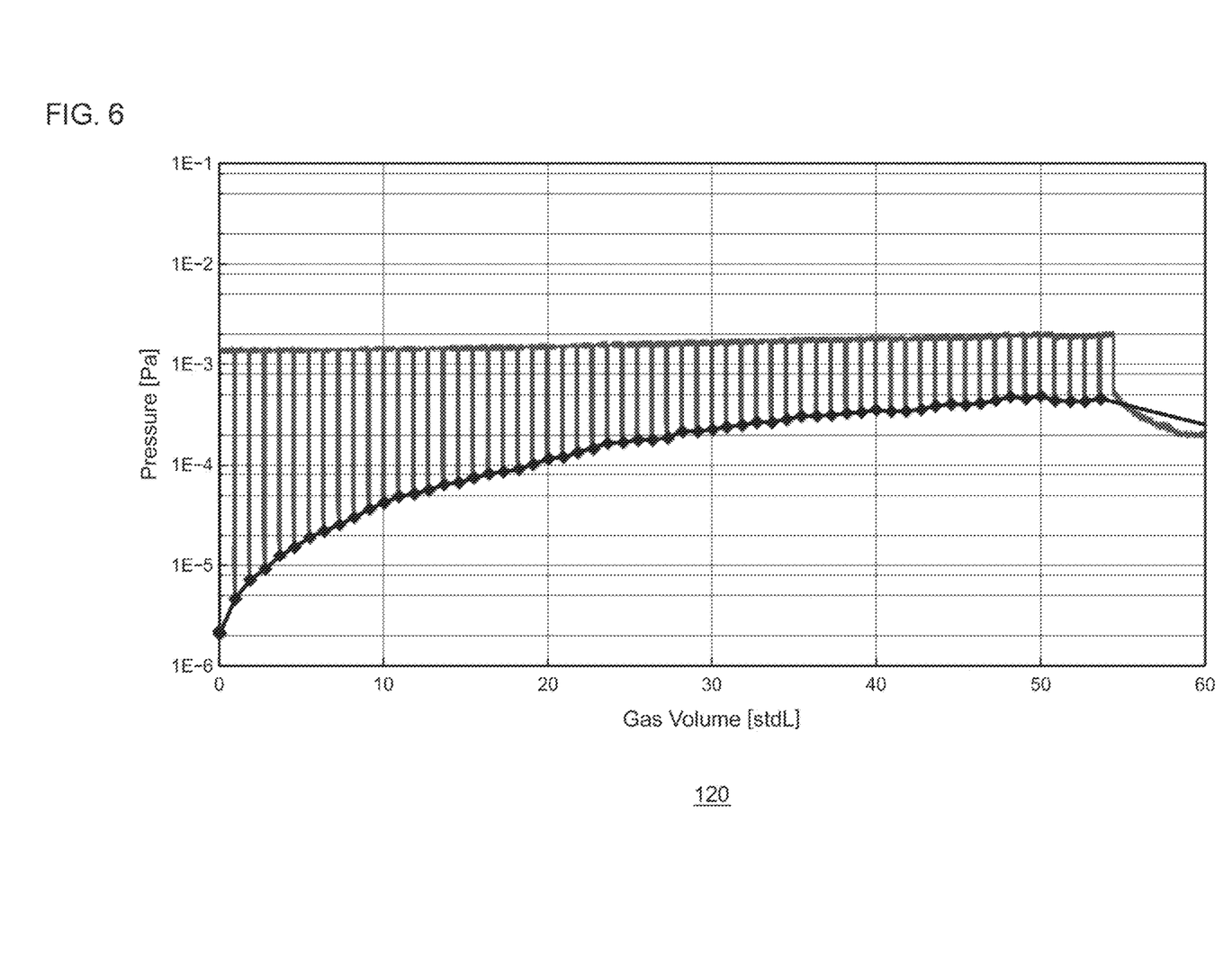
FIG. 6 illustrates a measurement result by the method of FIG. 5.

FIG. 6 illustrates a measurement result 120 by the method of FIG. 5. The horizontal axis shows the cumulative introduced gas amount, and the vertical axis shows the ultimate pressure P in a logarithm. The pressure during the introduction of the gas is slightly greater than $10^{-3}$ Pa. During the waiting time, the introduced gas is captured by the cryopump 10, and the pressure drops greatly. At the time of the start of the measurement, the pressure is lowered to about $10^{-6}$ Pa. The measured ultimate pressures are plotted with rhomboid marks. After the measurement, gas is introduced again. This is repeated many times. The ultimate pressure also gradually increases along with an increase in the gas amount.

Data in which the vertical axis and the horizontal axis of the measurement result 120 are interchanged corresponds to the adsorbed gas amount quantification function 116 illustrated in FIG. 3.

The present invention has been described above based on the embodiments. The present invention is not limited to the above-described embodiments, and it will be understood by those skilled in the art that various design changes can be made, various modification examples can be made, and such modification examples are also within the scope of the present invention.

The cryopump 10 may not be provided with the vacuum gauge 16. The vacuum gauge 16 may be installed at any place in the vacuum process apparatus 11. The vacuum gauge 16 may be installed at the vacuum chamber 50. The vacuum gauge 16 may measure the vacuum in the vacuum chamber 50 and output the vacuum measurement signal V. The adsorbed gas amount estimation unit 102 may be connected to the vacuum gauge 16 so as to receive the vacuum measurement signal V.

The cryopumped gas amount estimation method according to the embodiment of the present invention maybe applied to not only the type 3 gas such as hydrogen gas but also the type 2 gas such as argon.

It should be understood that the invention is not limited to the above-described embodiment, but may be modified into various forms on the basis of the spirit of the invention. Additionally, the modifications are included in the scope of the invention.

What is claimed is:

1. A cryopump comprising:
   a cryopump vacuum vessel;
   a vacuum gauge which is installed at the cryopump vacuum vessel so as to measure vacuum in the cryopump vacuum vessel and output a vacuum measurement signal; and
   a cryopumped gas amount estimation unit which is connected to the vacuum gauge so as to receive the vacuum measurement signal,
   wherein the cryopumped gas amount estimation unit is a controller configured to:
   determine an ultimate pressure of the cryopump vacuum vessel based on the vacuum measurement signal, and
   convert the ultimate pressure into a cryopumped gas amount estimated value using a cryopumped gas amount quantification relation correlating the ultimate pressure with the cryopumped gas amount estimated value.

2. The cryopump according to claim 1, wherein the cryopumped gas amount estimation unit is further configured to output the cryopumped gas amount estimated value.

3. The cryopump according to claim 2, wherein the cryopumped gas amount estimation unit outputs a ratio of the cryopumped gas amount estimated value to a gas capacity of the cryopump.

4. The cryopump according to claim 1, wherein:
the cryopump vacuum vessel includes a cryopump intake port configured to be closed by a gate valve, and
the cryopumped gas amount estimation unit is further configured to:
receive a cryopumped gas amount estimation start command;
output a closing command to the gate valve;
wait for a predetermined period of time after closing of the gate valve; and
determine the ultimate pressure of the cryopump vacuum vessel based on the vacuum measurement signal after waiting for the predetermined period of time.

5. The cryopump according to claim 1, wherein the vacuum gauge is an ionization vacuum gauge capable of measuring a high vacuum of $10^{-5}$ Pa.

6. A cryopumped gas amount estimation device comprising:
a controller, wherein the controller is configured to
determine an ultimate pressure of a cryopump vacuum vessel based on a vacuum measurement signal representing the degree of vacuum in the cryopump vacuum vessel; and
convert the ultimate pressure into a cryopumped gas amount estimated value using a cryopumped gas amount quantification relation correlating the ultimate pressure with the cryopumped gas amount estimated value.

7. A cryopumped gas amount estimation method comprising:
generating a vacuum measurement signal by measuring vacuum in a cryopump vacuum vessel;
determining an ultimate pressure of the cryopump vacuum vessel based on the vacuum measurement signal; and
converting the ultimate pressure into a cryopumped gas amount estimated value by using a cryopumped gas amount quantification relation correlating the ultimate pressure with the cryopumped gas amount estimated value.

\* \* \* \* \*